(12) United States Patent
Bettis

(10) Patent No.: US 6,938,074 B2
(45) Date of Patent: Aug. 30, 2005

(54) WORLD WIDE WEB ACCESS FOR VOICE MAIL AND PAGE

(75) Inventor: Sonny R. Bettis, Lawrenceville, GA (US)

(73) Assignee: Glenayre Electronics, Inc., Duluth, GA (US)

( * ) Notice: Subject to any disclaimer, the term of this patent is extended or adjusted under 35 U.S.C. 154(b) by 212 days.

(21) Appl. No.: 10/173,201

(22) Filed: Jun. 13, 2002

(65) Prior Publication Data

US 2002/0165918 A1 Nov. 7, 2002

Related U.S. Application Data

(62) Division of application No. 09/127,562, filed on Jul. 31, 1998, now Pat. No. 6,421,708.

(51) Int. Cl.[7] .............................................. G06F 15/16
(52) U.S. Cl. ...................................................... 709/217
(58) Field of Search ................................ 709/203, 206, 709/217

(56) References Cited

U.S. PATENT DOCUMENTS

| 4,837,798 | A | 6/1989 | Cohen et al. |
|---|---|---|---|
| 5,406,557 | A | 4/1995 | Baudoin |
| 5,479,411 | A | 12/1995 | Klein |
| 5,530,740 | A | 6/1996 | Irribarren et al. |
| 5,557,659 | A | 9/1996 | Hyde-Thomson |
| 5,572,643 | A | 11/1996 | Judson |
| 5,577,041 | A | 11/1996 | Sharma et al. |
| 5,608,783 | A | 3/1997 | Ichnowski et al. |
| 5,633,916 | A | 5/1997 | Goldhagen et al. |
| 5,675,507 | A | 10/1997 | Bobo, II |
| 5,737,395 | A | 4/1998 | Irribarren |
| 5,794,039 | A | 8/1998 | Guck |
| 5,848,415 | A | 12/1998 | Guck |
| 5,864,837 | A | 1/1999 | Maimone |
| 5,872,926 | A | 2/1999 | Levac et al. |
| 5,892,587 | A | 4/1999 | Okada et al. |
| 5,907,598 | A | 5/1999 | Mandalia et al. |
| 5,911,776 | A | 6/1999 | Guck |
| 5,951,636 | A | 9/1999 | Zerber |
| 5,987,100 | A | 11/1999 | Fortman et al. |
| 6,052,732 | A | 4/2000 | Gosling |
| 6,134,583 | A | 10/2000 | Herriot |
| 6,148,329 | A | 11/2000 | Meyer |
| 6,181,781 | B1 | 1/2001 | Porter et al. |
| 6,182,129 | B1 * | 1/2001 | Rowe et al. ................ 709/221 |
| 6,301,245 | B1 | 10/2001 | Luzeski et al. |
| 6,482,156 | B2 * | 11/2002 | Iliff ............................ 600/300 |
| 6,606,615 | B1 * | 8/2003 | Jennings et al. ............. 706/45 |
| 6,658,467 | B1 * | 12/2003 | Rice et al. .................. 709/224 |

FOREIGN PATENT DOCUMENTS

GB     2331817 A     2/1999

OTHER PUBLICATIONS

Harris, S., and G. Kidder, *Netscape Quick Tour for Macintosh: Accessing & Navigating the Internet's World Wide Web,* Ventana Press, Inc., Chapel Hill, North Carolina, Jan. 1995, p. 31.

* cited by examiner

*Primary Examiner*—David Y. Eng
(74) *Attorney, Agent, or Firm*—Christensen O'Connor Johnson Kindness PLLC

(57) ABSTRACT

A method and apparatus for providing subscribers with an integrated message processing system. The message processing system allows for the receipt, transmission and management of messages. Allowable message types include voice messages, pages, facsimile messages and electronic mail messages. The message processing system displays the information to the subscriber using a web browser. The majority of the graphical user interface resides locally in order to minimize the amount of data downloaded at runtime. The message processing system may be used locally in a closed environment or over the Internet.

6 Claims, 6 Drawing Sheets

WORLD WIDE WEB ACCESS FOR VOICE MAIL AND PAGE

CROSS-REFERENCE TO RELATED APPLICATION

This application is a division of application Ser. No. 09/127,562, filed Jul. 31, 1998, now U.S. Pat. No. 6,421,708.

FIELD OF THE INVENTION

This invention relates generally to integrated voice, facsimile, paging and electronic mail systems. More particularly, this invention relates to a message processing system which allows a subscriber to input, access, manipulate and originate voice, facsimile, paging and electronic mail data through a personal computer.

BACKGROUND OF THE INVENTION

A wide variety of communications alternatives are currently available to telecommunications subscribers. For example, facsimile transmission of printed matter is available through what is commonly referred to as a stand-alone facsimile machine. Alternatively, facsimile-modem communication systems are currently available for personal computer subscribers which combine the operation of a facsimile machine with the word processor of a computer to transmit documents held on computer disk. Modern communication over telephone lines in combination with a personal computer is also known in the art where file transfers can be accomplished from one computer to another. Also, simultaneous voice and modem data transmitted over the same telephone line has been accomplished in several ways.

There is a need, however, for a communications system which combines a wide variety of communication functions into an integrated hardware-software product such that the subscriber can conveniently choose a mode of communication from a single user interface.

SUMMARY OF THE INVENTION

In accordance with the present invention, a method and apparatus are provided for a message processing system. The message processing system provides a plurality of subscribers with the capability of transmitting, receiving and managing voice mail, facsimile, paging and electronic mail messages all within an integrated graphical environment. Message management includes displaying message summary information for all messages, displaying account information, such as number of calls placed on a given day, retrieving individual messages, creating messages, modifying messages and forwarding messages. The message processing system can operate locally in a closed environment, as well as over the Internet.

In accordance with another aspect of the invention, the subscriber may create an electronic mail message. The electronic mail message can be converted and ultimately sent to a pager or a cellular telephone. Alternatively, the electronic mail message can be converted and forwarded to another subscriber's voice mail account. It can also be converted to a facsimile message and sent to any facsimile machine.

In accordance with still another aspect of the invention, the message processing system divides a message into pages, including a header page. The message is transmitted one page at a time. The subscriber can cease transmission of the message at any time.

In accordance with a further aspect of the invention, the message processing system allows the subscriber the capability of specifying a method of notification of incoming messages. For example, the subscriber may be notified via page or cellular telephone.

In accordance with yet a further aspect of the invention, when a subscriber registers with the message processing system, a graphical user interface is downloaded to the remote client. By having the user interface stored locally, rather than downloading the user interface each time the subscriber uses the message processing system, the subscriber's display is updated more quickly.

Some of the advantages of the present invention include: platform independence; network independence; operating system independence; and common transport protocols to remote clients.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
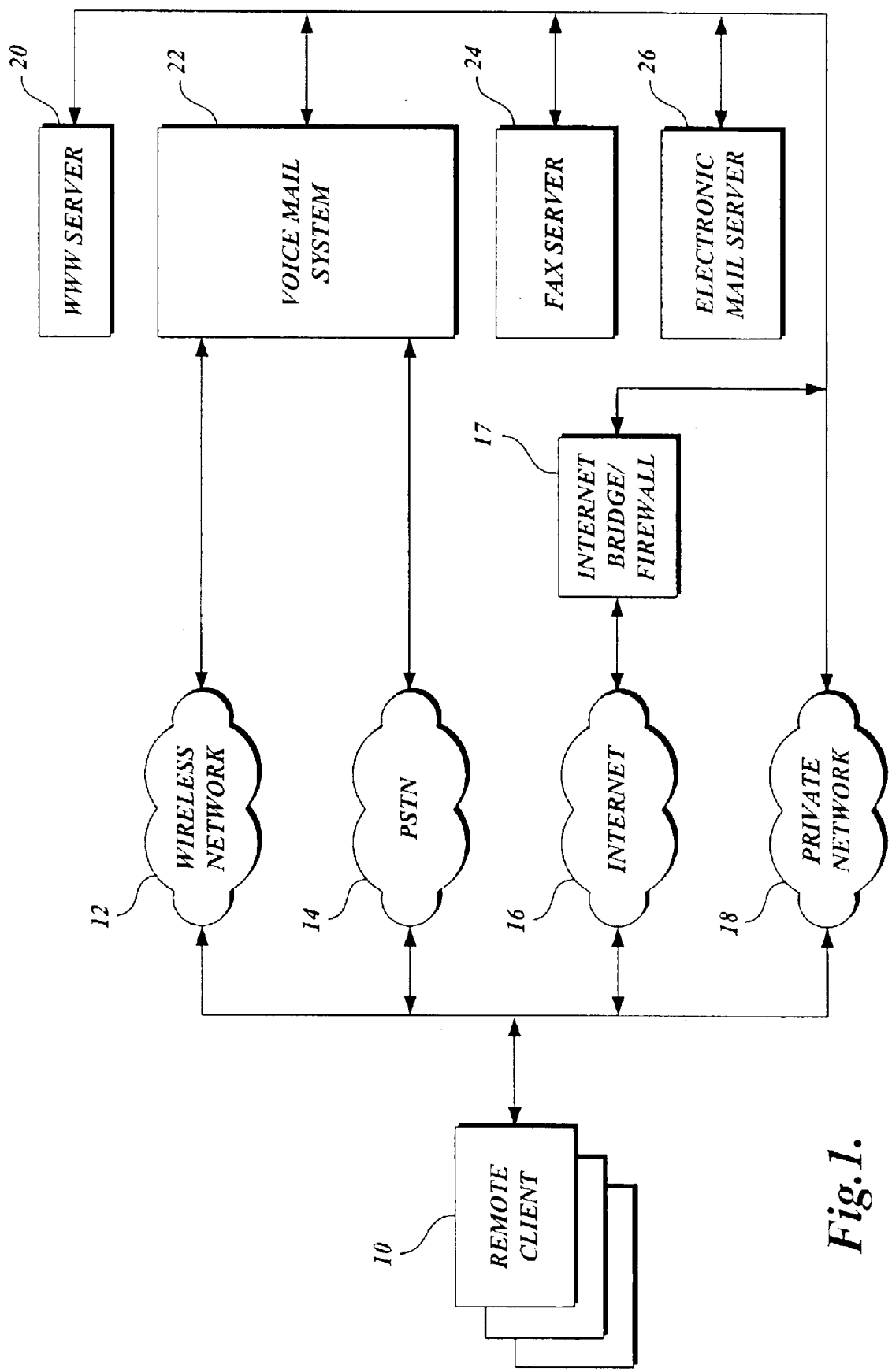
FIG. 1 is an exemplary environment in which a message processing system according to the present invention operates.

FIG. 1 is a block diagram of the message processing system of the present invention. The message processing system can be viewed as having three major components: a plurality of remote clients 10; a collection of server components 20, 22, 24, and 26; and a choice of communication medium 12, 14, 16 and 17, or 18. Each user of the message processing system, known as a subscriber, uses a remote client 10 to access the server components 20, 22, 24, and 26 of the message processing system. The remote client 10 accesses the server components of the message processing system via one of the available communication media 12, 14, 16, or 18.

Figure 1A:
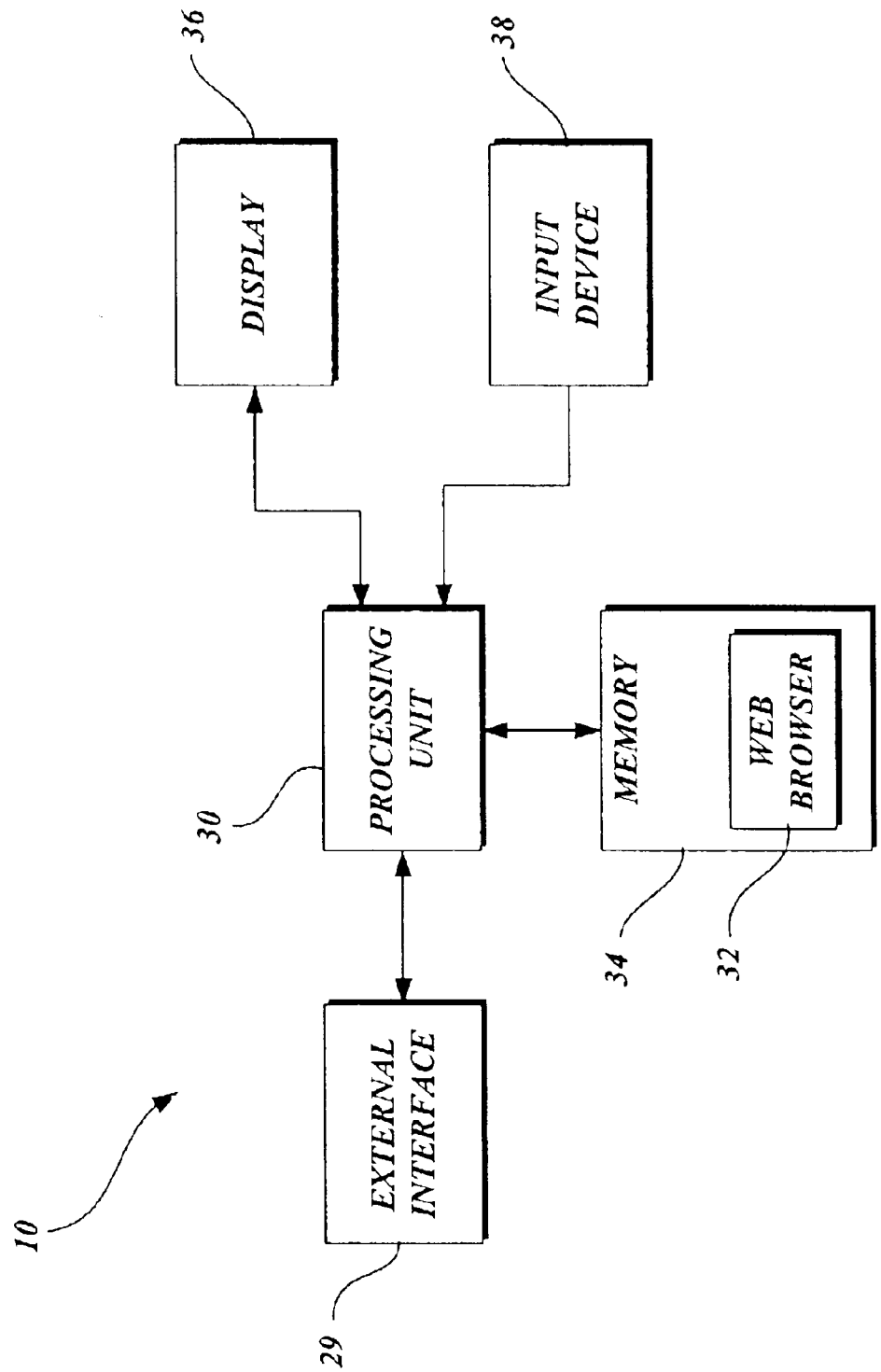
FIG. 1A is a block diagram of the several components of a remote client shown in FIG. 1.

The key components of an individual remote client are illustrated in FIG. 1A. The remote client 10 is any computer including a desktop Personal Computer (PC), a laptop PC or a Personal Digital Assistant (PDA). Those of ordinary skill in the art will appreciate that the remote client 10 includes many more components than those shown in FIG. 1A. However, it is not necessary that all of these generally conventional components be shown in order to disclose an illustrative embodiment for practicing the present invention. As shown in FIG. 1A, the remote client 10 includes a processing unit 30, a display 36 and a memory 32. Memory 32 generally comprises a random access memory (RAM), read only memory (ROM), and a permanent mass storage device, such as a hard disk drive, tape drive, optical drive, floppy disk drive, or a combination thereof. The memory 32 stores the program code and data necessary for displaying a user interface portion of the message processing system.

The user interface portion of the message processing system is viewed by the subscriber on the display 36 of the remote client 10 by means of any off-the-shelf web browser 34 or by a JAVA™ application obtained using the web browser. Once the JAVA™ application is obtained, the JAVA™ application can be executed without the need for the web browser. The remote client 10 also includes an input device 38 for entering commands to the user interface. The input device may be a keyboard, mouse, track-ball, etc., or some combination of the above-mentioned devices.

As shown in FIG. 1A, the remote client 10 includes an external interface 29. The external interface is the means by which the remote client 10 connects to the server components 20, 22, 24, and 26 as shown in FIG. 1. This connection may be via an intranetwork, an internetwork or a modem. Accordingly, external interface 29 includes the necessary circuitry for such a connection, and is also constructed for use with the TCP/IP protocol (if an internetwork connection), the particular network configuration of the local area network or wide area network it is connecting to, and a particular type of communication medium.

Returning to FIG. 1, the remote client 10 requires a method of connecting to the server components 20, 22, 24, and 26 of the message processing system. The remote client 10 may connect to the server components via a voice mail system 22 component over a wireless network 12, or a public switched telephone network (PSTN) 14. Once a connection is made to the voice mail system, the remote client 10 can communicate with all of the other server components of the message processing system, namely, a World Wide Web (WWW) server 20, a facsimile (fax) server 24 and an electronic mail server 26. The remote client 10 can connect directly to all of the server components via a private network (e.g. a LAN). The remote client can also connect directly to all of the server components over the Internet 16. A firewall 17 is provided for security purposes to prevent unauthorized access into the message processing system over the Internet. Once the subscriber has made a connection from the remote client 10 via any one of the communication media described above, the subscriber can access all of the server components either directly or indirectly over the selected communication media.

The message processing system receives, manages and transmits messages of a myriad of formats comprising voice, paging, facsimile, and electronic mail. The voice mail system 22 is the mechanism for transmitting and receiving voice messages and pages. The voice mail system is also the server component that contains a central database. The central database is a repository for all of the messages stored for each subscriber, irrespective of the message format (e.g. voice, page, facsimile, electronic mail). This includes all new messages, as well as all saved messages. The central database also stores information about each subscriber, known as profile information. Details about the subscriber's profile information are described below in connection with a registration function shown in a block 58 of FIG. 3.

The World Wide Web (WWW) server 20 consists primarily of off-the-shelf components. It also includes a protocol capable of communicating with the voice mail system 22 and the facsimile (fax) server 24. Subscriber information and messages retrieved by the WWW server 20, as well as facsimile messages received by the facsimile server 24, are deposited into the central database on the voice mail system 22 by the WWW server 20. The WWW server 20 must be able to support JAVA™ clients. Ideally, the web browser 34 running on the remote client 10 will be JAVA™ capable. The WWW server 20 also provides all of the necessary message conversion functionality. For example, conversions are necessary to convert between various graphical data formats, such as TIFF, and facsimile data formats, such as G3/G4. The WWW server 20 also provides the capability for Multipurpose Internet Mail Extension (MIME) encoding of messages. MIME encoding may be necessary for actually playing voice mail messages or panning facsimile messages by the remote client 10.

The WWW server 20 can also divide a message into multiple pages, or sub-pages for transmission to the remote client 10. This allows the remote client 10 to begin displaying a header and the first pages of the message without first having to wait for the entire message to be downloaded. Present message processing systems require the entire message to be downloaded prior to displaying the message. This can be very time consuming. For example, in a wireless community, the bandwidth to the remote client may be as low as 2400 Bits Per Second (BPS). A typical facsimile page in G3 compressed format contains approximately 65535 byes of data. Using a baud rate of 2400 BPS, it would take about 3.6 minutes to receive one facsimile page. By dividing the message into pages, the present invention allows the remote client the capability of terminating the transmission of the message at any time.

The electronic mail server 26 is an off-the-shelf components which provides for receipt, storage and transmission of electronic mail messages.

Figure 2:
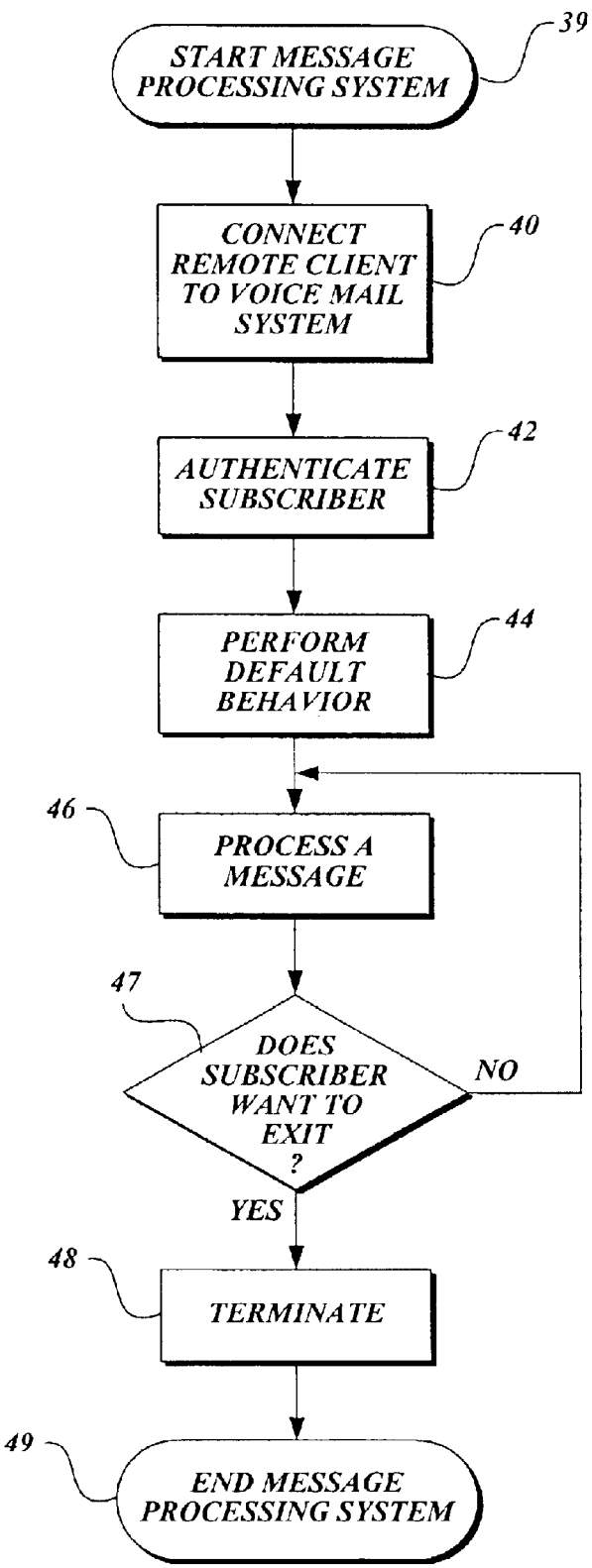
FIG. 2 is flow diagram illustrating the logic used by the message processing system.

FIG. 2 is a flow diagram depicting the overall logic used by the message processing system. As can be seen in FIG. 1, and noted above, a plurality of remote clients 10 can use the message processing system simultaneously. The logic depicted in the flow diagram is for one subscriber using the message processing system via one remote client 10. It will be appreciated that the logic shown in FIG. 2 will be repeated for each subscriber using the message processing system by means of a remote client 10.

The logic begins in FIG. 2 in a block 39 and proceeds to a block 40 in which the subscriber connects to the voice mail system component 22 of the message processing system using one of the methods of connection discussed above in conjunction with FIG. 1. Upon connection to the voice mail system 22, the logic proceeds to a block 42 where the subscriber is authenticated. The subscriber authentication process is shown in detail in FIG. 3.

Figure 3:
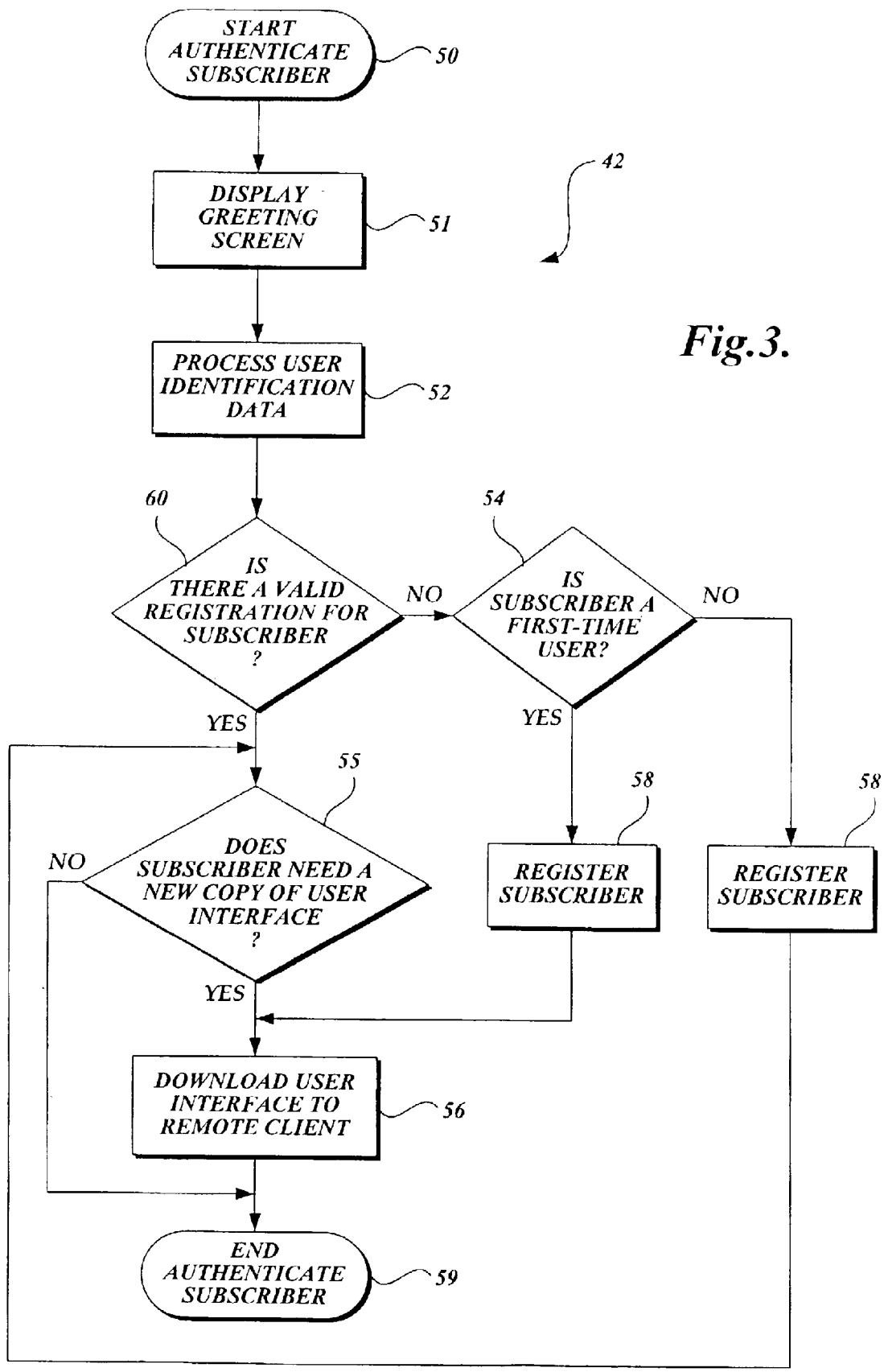
FIG. 3 is flow diagram illustrating the logic used to authenticate a subscriber.

The logic authenticating a subscriber as shown in FIG. 3 begins in a block 50 and proceeds to a block 51 with the display of a greeting screen on the remote client 10. The greeting screen requests the subscriber's identification and password. After the subscriber's identification and password have been entered, the logic proceeds to a block 52 where the message processing system processes the subscriber identification data in order to verify that a valid combination of subscriber identification and password have been entered. Once a valid combination of subscriber identification and password has been entered, the logic proceeds to a decision block 60 which determines whether there is a valid registration for the subscriber.

If in decision block 60 it is determined that there is a valid registration for the subscriber, the logic proceeds to a decision block 55 to determine whether the subscriber requires a user interface to be downloaded to the remote client 10. Possible reasons for an existing subscriber needing to download a new user interface include the subscriber moving to a new remote client computer or an upgrade to the user interface. By downloading the majority of the user interface so that it can be run locally on the remote client, the amount of information downloaded to the remote client 10 during run-time is greatly reduced, thereby updating the remote client's display 36 more quickly. If in decision block 55 it is determined that the subscriber does need a new copy of the user interface, the logic proceeds to a block 56 where a copy of the user interface is downloaded to the remote client 10.

If it is determined in decision block 60 that there is not a valid registration for the subscriber, then the logic proceeds to a decision block 54 to determine whether the subscriber is a first-time user. If the subscriber is a first-time user, then the logic proceeds to a block 58 to register the subscriber followed by block 56 where the user interface is downloaded to the remote client 10.

The registration process 58 requests profile information from the subscriber. This profile information includes items such as the subscriber's name, address, telephone number, facsimile number, electronic mail address, and password. The profile information also includes subscriber preferences such as a default behavior, a greeting a caller will hear when he or she calls to reach the subscriber, and how the subscriber will be notified of incoming calls (e.g. pager or cellular phone). In an actual embodiment of the present invention, the registration service utilizes a secure Hyper-Text Markup Language (HTML) method to ensure privacy.

If, on the other hand, the determination in decision block 60 is that there is not a valid registration, but the determination in decision block 54 is that the subscriber is not a first-time user, then the logic will proceed to block 58 to re-register the subscriber. The user interface will not be downloaded automatically since it is assumed that if the subscriber is not a first-time user, a user interface has previously been downloaded to the remote client 10. However, the logic will proceed to decision block 55 to determine whether a new copy of the user interface needs to be downloaded to the remote client 10. In an actual embodiment of the present invention, the subscriber's version of the user interface is checked, and if there is a more recent version of the user interface available, the subscriber is notified. The subscriber may then choose whether or not to have the new version of the user interface downloaded. If it is determined in decision block 55 that the subscriber needs a new copy of the user interface, then the logic proceeds to block 56 where the user interface is downloaded to the remote client 10.

Following any required registration 58 and/or download of the user interface to the remote client 56, the logic then proceeds to a block 59 where the authenticate subscriber logic terminates.

Figure 4:
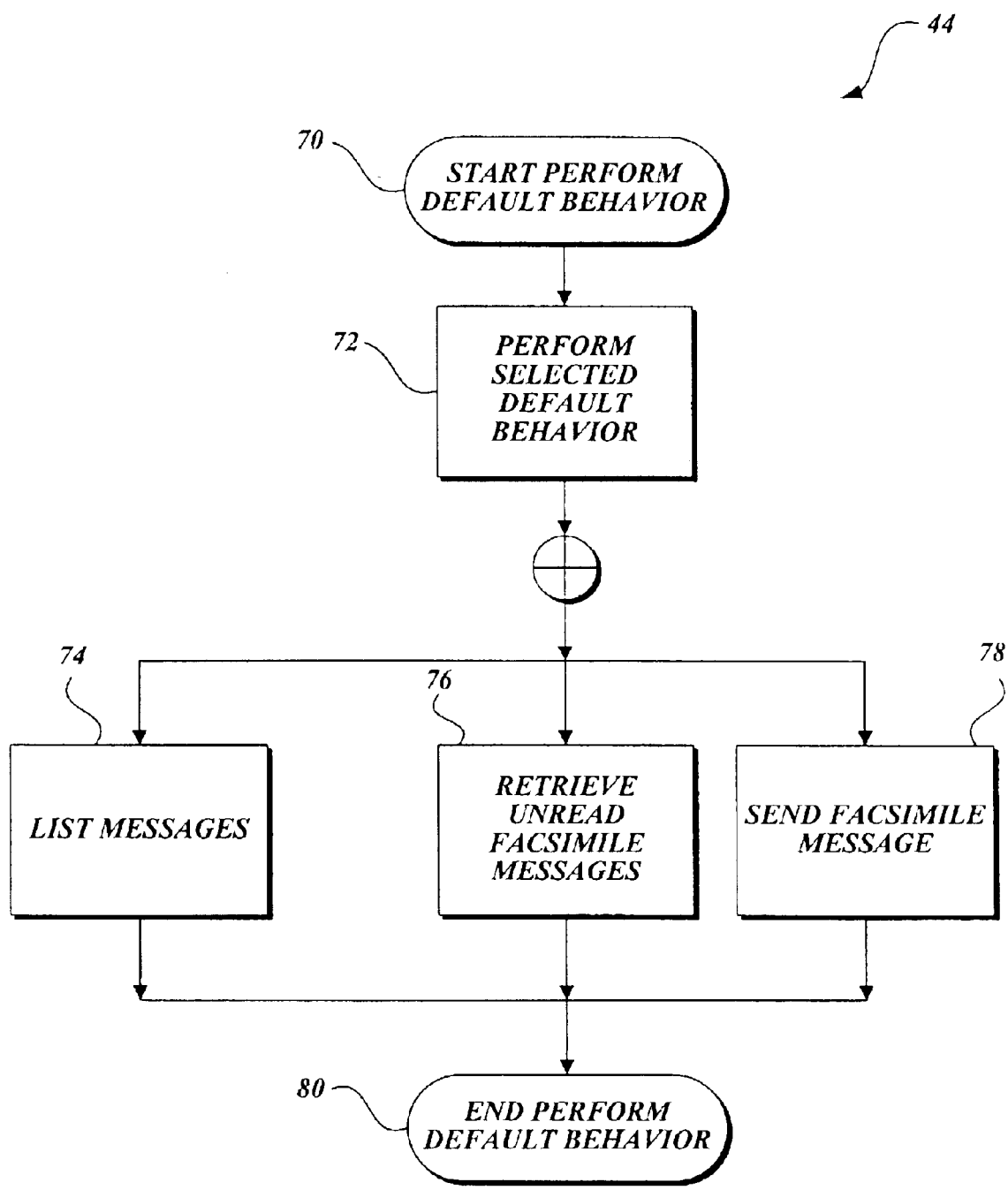
FIG. 4 is flow diagram illustrating the logic used to perform the default behavior.

Returning to FIG. 2, once the subscriber has been authenticated 42, the logic proceeds to a block 44 where the default behavior as specified in the subscriber's profile is performed. The performance of the default behavior is depicted in FIG. 4. The logic in FIG. 4 begins in a block 70 and proceeds to a block 72 for determination of the default behavior that is to be performed. The default behavior is configurable by the remote client 10. The same default behavior will be used each time the remote client activates the message processing system until the remote client changes the selected default behavior.

The default behavior may be selected from among the following: list messages available for retrieval; retrieve all unread facsimile messages; or send a facsimile message. If in block 72 it is determined that the selected default behavior is to list all messages, the logic proceeds to a block 74 where the message processing system will transmit a list containing subscriber summary information about all of the subscriber's messages currently stored in the database to the remote client 10 for display. If in block 72 it is determined that the selected default behavior is retrieve all unread facsimile messages, then the logic proceeds to a block 76 where all unread facsimile messages will be downloaded from the message processing system to the remote client 10. In an actual embodiment of the present invention, the unread facsimile messages will be download in priority, i.e. high priority messages first. Within a given priority, messages are downloaded on a first-in-first-out basis. The subscriber may cease download of the facsimiles from the message processing system at any time. The subscriber may terminate the download of a specified message or of all messages. Finally, if in block 72 it is determined that the selected default behavior is to send a facsimile message, then the logic proceeds to a block 78 where the remote client 10 will immediately begin a facsimile upload when it connects to the server components. In an actual embodiment of the present invention, facsimile messages are stored in a default directory. All messages in the default directory will be uploaded when the remote client 10 connects to the server components. Irrespective of the default behavior performed as determined by block 72, once the appropriate default behavior has been performed, the logic proceeds to a block 80 where the logic for the performance of the default behavior is terminated.

Figure 5:
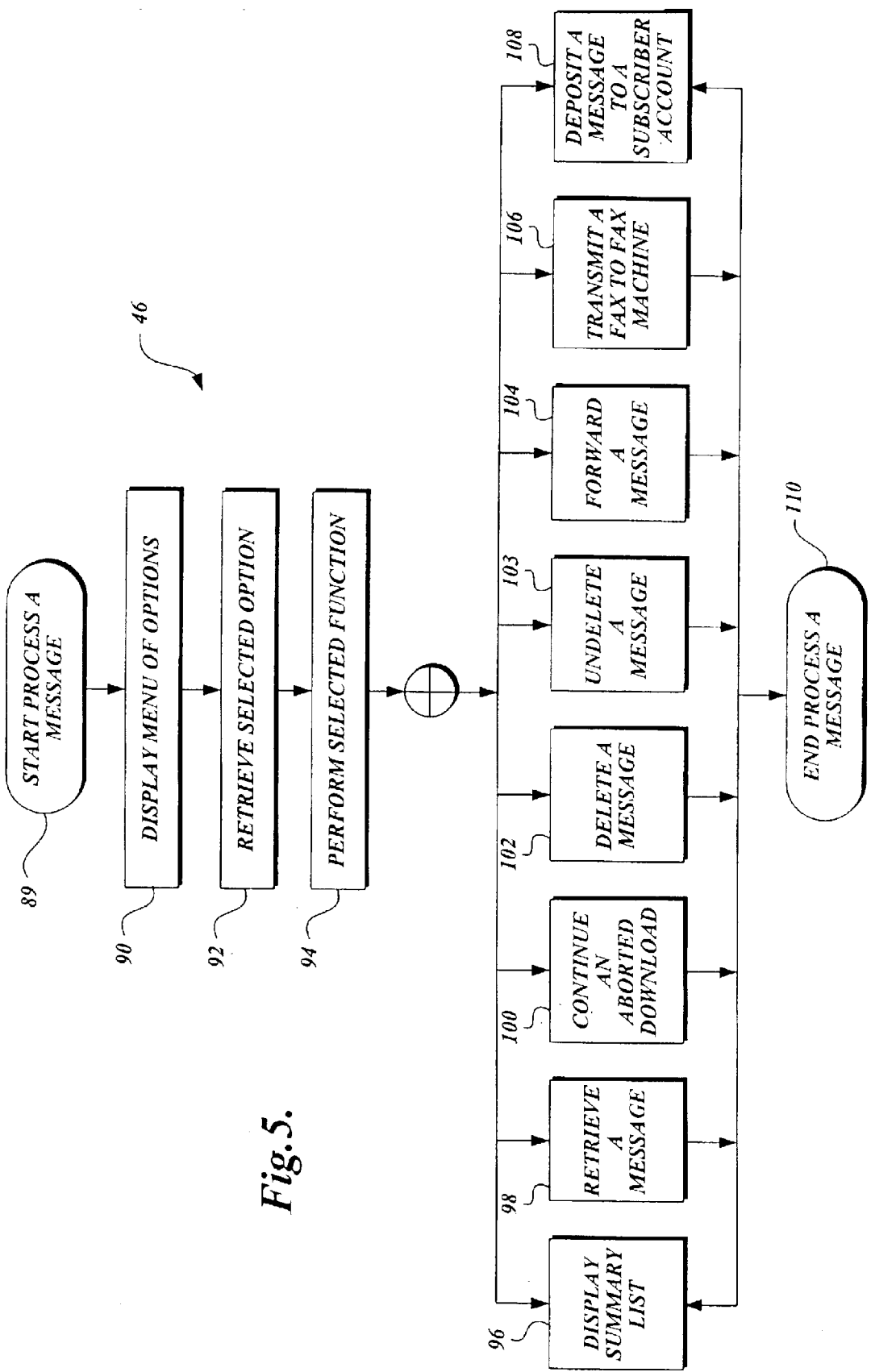
FIG. 5 is flow diagram illustrating the logic used to process a message.

Returning to FIG. 2, after the default behavior is performed 44, the logic proceeds to a block 46 where a message is processed. FIG. 5 shows in more detail the logic of the process a message 46 function. The logic in FIG. 5 begins in a block 89 and proceeds to a block 90 where a menu of options is displayed on the remote client 10. The possible functions comprise: displaying a summary list; retrieving a message; continuing an aborted download; deleting a file; un-deleting a previously deleted message; forwarding a message; transmitting a facsimile to a facsimile machine; or depositing a message directly into another subscriber's account. The logic then proceeds to a block 92 where the subscriber selects one of the options from the menu displayed by block 90. The subscriber's selection is transmitted to the voice mail system 22 for processing. The logic then proceeds to a block 94 where the function specified by the subscriber is performed. The types of messages which may be processed include any of the valid message types, unless specifically stated to the contrary. Valid message types include voice mail, facsimile messages, pages, and electronic mail message.

If in block 94 it is determined that the subscriber selected the display summary list option, then the logic proceeds to a block 96 where information for each message that is currently in the subscriber's account, is presented to the subscriber. This information includes the message type (e.g., facsimile, voice, etc.), message state (i.e., new, saved), message status (e.g., urgent, confidential), message time and date, and if the message is a facsimile, the number of pages and the station identifier are also displayed.

If in block 94 it is determined that the subscriber selected the retrieve a message option, the logic then proceeds to a block 98 where a message selected by the subscriber is retrieved. In an actual embodiment of the present invention, if the subscriber wishes to retrieve a message, summary information is displayed for all of the messages. The subscriber then selects which message or messages, if any, are to be retrieved.

If in block 94 it is determined that the subscriber elected to continue an aborted download, then the logic proceeds to a block 100 where the subscriber can continue the download of a specified message. In an actual embodiment of the present invention, the subscriber may choose to continue the download of one or more messages which were previously aborted. In an actual embodiment of the present invention, if the user selects the continue aborted transmission function, summary information for all aborted transmissions is displayed. The subscriber may then select which messages, if any, to continue downloading. The subscriber may also elect to continue the download of all previously aborted transmissions. The continuation of a transmission begins at the position in the message where the transmission was aborted. If the subscriber wishes to download the entire message, the subscriber can choose the retrieve message function as described above.

If in block 94 it is determined that the subscriber elected to delete a message, then the logic proceeds to a block 102 where a message selected by the subscriber is deleted. Any message, including voice messages, may be deleted at any time, including during transmission of the message. Deleted messages will be placed in a trash folder. In other words, they are marked for deletion, but are not actually deleted. The messages are actually deleted from the message processing system when the message is deleted from the trash folder. In one embodiment of the present invention, the subscriber may configure the system to automatically delete messages in the trash folder upon exit from the message processing program. If in block 94 it is determined that the subscriber selected the un-delete of a previously deleted message function, the logic proceeds to a block 103. Messages still in the trash folder may be restored by using the un-delete function. Once a message has been deleted from the trash folder, it cannot be un-deleted.

If in block 94 it is determined that the subscriber chose to forward a message, then the logic proceeds to a block 104 where a selected message may be forwarded to a destination entered by the subscriber. If in block 94 it is determined that the subscriber chose to transmit a facsimile to a specified facsimile machine, then the logic proceeds to a block 106 where the specified facsimile is transmitted to the specified facsimile machine. Finally, if in block 94 it is determined that the subscriber chose to deposit a message to another subscriber's account, then the logic proceeds to block 108 where the specified message is deposited directly into another valid subscriber's account by entering the recipient's subscriber identification information. Irrespective of the function performed as determined by block 94, once the desired function has been performed, the logic proceeds to a block 110 where the logic for the process a message function terminates.

Returning to FIG. 2, after a message is processed, the logic proceeds to a decision block 47 where it is determined whether the subscriber wishes to exit from the message processing system. If the subscriber wishes to exit from the message processing system, the logic proceeds to a termination function in a block 48. The termination function closes any open files, disconnects the remote client 10 from the message processing system, and shuts down the user interface running on the remote client 10. On the other hand, if in decision block 47 it is determined that the user does not wish to terminate, then the message processing function 46 will be performed again. In this regard, following the performance of the default behavior 44, the message processing function 46 is repeatedly performed until the subscriber wishes to exit as determined in decision block 47.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A message processing system, comprising:
    (a) a management component including at least one server, wherein said management component manages a plurality of messages by:
        (i) storing each of the plurality of messages in a first file format;
        (ii) upon request:
        retrieving a message in the first file format;
        converting the message in the first file format to a message in a second file format if necessary; and
        supplying the requested message to a subscriber;
    (b) a display component, wherein said display component displays the plurality of messages;
    (c) a remote client;
    (d) a communications media, wherein said communications media facilitates communications between said remote client and said management component, and wherein said display component is transmitted to said remote client over said communications media.

2. The message processing system of claim 1, wherein said display component is a self-contained program providing a user interface, the self-contained program stored and executed on said remote client.

3. The message processing system of claim 2, wherein said display component is a JAVA™ application.

4. The message processing system of claim 1, wherein said communications media is a selected one from a group comprising a wireless network, a public switched telephone network, an Internet and a private network.

5. The message processing system of claim 1, wherein said display component is a self-contained program for execution on said remote client and is downloaded to said remote client if said remote client does not have said self-contained program or said remote client has an older version of said self-contained program.

6. The message processing system of claim 5, wherein said self-contained program is automatically downloaded to said remote client if said remote client has an older version of said self-contained program.

* * * * *